United States Patent
Matthia et al.

(10) Patent No.: US 9,372,483 B2
(45) Date of Patent: Jun. 21, 2016

(54) METHOD FOR THE CALCULATION OF FLIGHT PATHS TAKING INTO CONSIDERATION EVENTS OF RELEVANCE FOR RADIATION DOSE

(71) Applicant: Deutsches Zentrum fur Luft- und Raumfahrt e.V., Cologne (DE)

(72) Inventors: Daniel Matthia, Cologne (DE); Matthias Meier, Konigswinter (DE); Michael Wirtz, Cologne (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 14/430,294

(22) PCT Filed: Aug. 28, 2013

(86) PCT No.: PCT/EP2013/067843
§ 371 (c)(1),
(2) Date: Mar. 23, 2015

(87) PCT Pub. No.: WO2014/044511
PCT Pub. Date: Mar. 27, 2014

(65) Prior Publication Data
US 2015/0227141 A1    Aug. 13, 2015

(30) Foreign Application Priority Data
Sep. 21, 2012 (DE) .......... 10 2012 217 038

(51) Int. Cl.
*G05D 1/02* (2006.01)
*G01C 21/00* (2006.01)

(52) U.S. Cl.
CPC .............. *G05D 1/0202* (2013.01); *G01C 21/00* (2013.01)

(58) Field of Classification Search
CPC ....... G05D 1/0202; G01C 21/00; G01W 1/12; G01T 1/17; G01T 1/00; G01T 1/30; G01T 1/2907; G01T 7/00; G01T 7/06; G01T 5/00; G01T 3/00; G01V 5/02; G01V 5/025
USPC .......................................... 701/400
See application file for complete search history.

(56) References Cited

U.S. PATENT DOCUMENTS 5,602,543 A  2/1997  Prata et al.
5,841,142 A  11/1998  Duftschmid et al.
(Continued)

FOREIGN PATENT DOCUMENTS

AT     408 379 B     11/2001
DE     691 27 750 T2  4/1998
EP     0 671 637 A1   9/1995

OTHER PUBLICATIONS

International Search Report and Written Opinion for corresponding patent application No. PCT/EP2013/067843 dated Nov. 26, 2013.

*Primary Examiner* — McDieunel Marc
*Assistant Examiner* — James E Stroud
(74) *Attorney, Agent, or Firm* — Renner, Otto, Boisselle & Sklar, LLP

(57) ABSTRACT

A method for the calculation of flight paths taking into consideration events of relevance for the radiation dose comprises the following steps: a) collection of radiation data for atmospheric radiation (10); b) examination of the radiation data and conclusion about an event of relevance for radiation dose generating a temporary increase in exposure; c) creation of a model using the radiation data, wherein the model contains at least one estimate of the geographical location of a region with a radiation intensity increased by the event of relevance for radiation dose; d) determination of flight-relevant parameters; e) calculation of a possible flight path in the light of the flight-relevant parameters taking into consideration the model created in step c), wherein the flight path is adjusted in respect of a reduction of exposure to radiation.

12 Claims, 1 Drawing Sheet

(56) References Cited

U.S. PATENT DOCUMENTS

| | | |
|---|---|---|
| 6,184,816 B1 | 2/2001 | Zheng et al. |
| 7,096,121 B2 | 8/2006 | Intriligator et al. |
| 2001/0053617 A1 | 12/2001 | Shoji |
| 2003/0220740 A1* | 11/2003 | Intriligator .............. G01W 1/10 702/3 |
| 2007/0129973 A1 | 6/2007 | Wollenberg |
| 2012/0256762 A1* | 10/2012 | Greenberger ............ H04Q 9/00 340/870.03 |
| 2014/0226860 A1* | 8/2014 | Hyde ................. G06K 9/00362 382/103 |
| 2015/0123004 A1* | 5/2015 | Meier ....................... G01T 7/12 250/395 |
| 2015/0276627 A1* | 10/2015 | Clemen, Jr. ............ G01N 23/12 250/360.1 |

\* cited by examiner

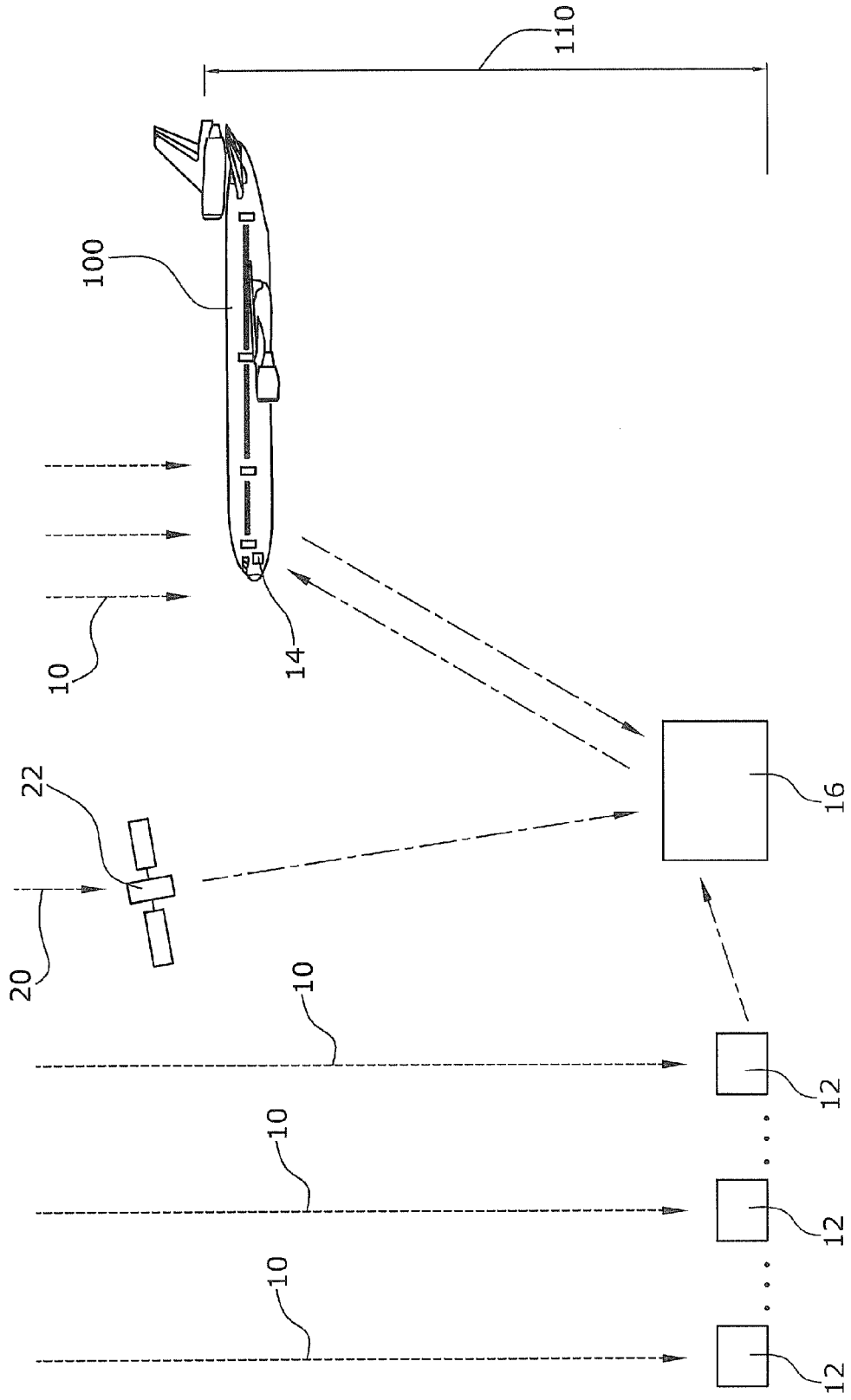

METHOD FOR THE CALCULATION OF FLIGHT PATHS TAKING INTO CONSIDERATION EVENTS OF RELEVANCE FOR RADIATION DOSE

The present invention relates to a method for the calculation of flight paths taking into consideration events of relevance for the radiation dose.

Due to the galactic cosmic radiation, exposure to radiation at the cruising altitudes of civil aviation (FL280-FL410) is increased by a factor of about 100 as compared to terrestrial exposures. Further, the radiation field is heavily dependent on the local shielding effect of the terrestrial magnetic field, e.g. parameterized by the geometric latitude. This radiation field is further influenced by the variation of the interplanetary magnetic field caused by the solar cycle. These different independent influences lead to a radiation field at cruising altitudes that is very complex in its composition and energy distribution.

Apart from the galactic cosmic radiation, there exist further temporary radiation contributions to the radiation field which are generated by solar or galactic events. For instance, within the solar cycle, such temporary radiation contributions will occur due to the solar cosmic radiation when, as a result of radiation bursts on the sun, i.e. so-called SPEs (English abbreviation for solar particle events), particles are generated which are sufficiently energy-rich to penetrate the magnetosphere and the upper layers of the atmosphere.

The occurrence of radiation bursts on the sun that may lead to an additional radiation exposure at cruising altitudes cannot be reliably predicted with the aid of the present methods. The reason for this is that only the high-energy component (>500 MeV/n) of the particles emitted in such a solar radiation burst can enter the atmosphere deeply enough. However, these high-energy components are so fast that—in comparison to the optical and respectively roentgen radiation which, too, is emitted in case of radiation outbursts—they will only reach the earth with a delay of several minutes. Thus, in flight planning, the lack of information makes it impossible to consider corresponding dose-reducing measures such as e.g. a flight path with better geomagnetic shielding, or lower cruise altitudes, in the individual case. On the other hand, a general planning involving such measures would be less economical because of the resultant increased fuel consumption, and would also be critical under the ecological aspect because of the correspondingly higher emission of pollutants.

In the absence of predictability of dose-relevant solar radiation outbursts, such events can be detected only after the resultant increase of radiation intensity. Basically, this is possible by direct or indirect methods. In aviation, for example, the dose rate associated with the radiation exposure at cruising altitudes, i.e. both the energy dose rate dD/dt and the environment equivalent dose rate dH*(10)/dt can be measured directly in an aircraft with the aid of suitable dose meters. In the past, however, upon occurrence of solar events with temporary increase of radiation, the dose rates detected by means of a dosimeter during a flight have partially lead to critical situations because the aviator performed unplanned changes of the flight path or reduced the flight altitude in an effort to decrease the exposure to radiation, which resulted in distinctly higher fuel consumption.

However, the information indicated aboard an aircraft with respect to a temporary increase of exposure is related to the respective position of the aircraft, i.e. the displayed information of dose rate measurement devices does not make it possible to conclude how the dose rate would change in case of a reduction of the cruise altitude or a change of course to a more southern route. This unpredictability of the spatial distribution of the dose rate in case of radiation outbursts is caused by the fact that said dose rate distribution substantially depends on the primary particle flow and its direction of incidence and energy distribution, which, however, is not accessible to observation by merely using an aircraft-based measurement device. The determinants of the dose rate distribution are massively dependent on the respective individual event and may vary over a wide range so that an observation of generalized parameters is not possible.

Further, during a flight, the aviator normally does not have sufficient information at hand as to whether, in case of a change of the flight path and/or cruise altitude, the flight to the scheduled destination would still be possible at all, e.g. under the aspect of a limited fuel quantity. Thus, on the basis of the radiation data measured directly aboard the aircraft, no reasonable options for action can be obtained.

A reduction of the exposure to radiation in aviation is, however, desirable for achieving a dose reduction according to §94 of the German Radiation Protection Ordinance (StrlSchV) and for a reasonable implementation of the ALARA principle (as low as reasonably achievable).

Thus, it is an object of the present invention to provide a method for computation of flight path under consideration of events of relevance for the radiation dose.

The invention is defined by the features of claim 1.

The invention provides that, in the method for the calculation of flight paths taking into consideration events of relevance for the radiation dose, the following steps are carried out:

a) collection of radiation data of the atmospheric radiation,
b) examination of the radiation data and conclusion about an event of relevance for the radiation dose that generates a temporary increase in exposure,
c) creation of a model using the radiation data, the model containing at least one estimate of the spatial location of a region with a radiation intensity increased by the event of relevance for the radiation dose,
d) determination of flight-relevant parameters,
e) calculation of a possible flight path in view of the flight-relevant parameters taking into consideration the model created in step c), the flight path being adjusted in respect of a reduction of an exposure to radiation.

Thus, the method of the invention makes it possible to timely detect events of relevance for the radiation dose, for example solar and galactic events such as e.g. radiation outbursts on the sun, and, on the basis of a model correspondingly adapted to the characteristics of the radiation outburst, to calculate the possibility of complying with predefined radiation levels while taking into consideration the flight-relevant parameters and, thus, to inform the aviator of recommended actions or to consider such recommended actions in the planning of a flight path. When capturing the radiation data of the atmospheric radiation, there can be determined e.g. high-energetic ionized radiation portions.

Within the framework of the invention, flight-relevant parameters are to be understood to comprise e.g. fuel quantities and respectively a fuel reserve and, possibly, predetermined flight times, fuel consumption, meteorological data or the like, but also economical factors.

According to one embodiment of the method of the invention, it is provided that, in step d), the flight-relevant parameters are determined, before a flight, for calculation of a flight path as an alternative to a conventional flight path in step e). In other words: The method of the invention can provide that, already when creating a flight path before the start, the model created in step c) is considered. Thus, after the event of relevance for the radiation dose, flight paths can be calculated for a certain period of time in such a manner that the exposure to radiation is reduced. This can be performed e.g. by performing a tradeoff between a possibly increased fuel consumption, which can be handled by a correspondingly higher refueling quantity, and the radiation dose occurring during the flight. As a result, the flight path which is to be planned can be optimized with respect to economical and health-relevant aspects.

The method of the invention can also provide that, in step d), the flight-relevant parameters of an aircraft in flight are determined for calculation of a bypass route as an alternative flight path in step e). Consequently, the method of the invention is also suited for aircraft which are already in flight, wherein, under consideration of the remaining flight path as well as the fuel quantity, the load-dependent fuel consumption and the meteorological data, there is calculated a bypass route which is possible under these marginal conditions so as to achieve a reduction of an exposure to radiation. Thus, it is calculated whether the remaining fuel quantity or fuel reserve on the aircraft is sufficient e.g. to make it possible to bypass the region with increased radiation intensity or to change to a lower cruise altitude.

Preferably, it is provided that the radiation data are detected by measurement stations, preferably neutron monitors, arranged at different geographic positions, and/or by measurement stations installed in commercial aircraft.

The measurement stations arranged at different geographic positions conveniently offer the opportunity to obtain radiation data allowing for an estimation of the spatial position of a region with increased radiation intensity caused by the event of relevance for the radiation dose, since, because of the different geographic positions, it can be detected in which region an increased radiation intensity has occurred. Particularly in case of events of relevance for the radiation dose on the sun, the measurement stations arranged at different geographic positions are of advantage because, via these measurement stations, it is possible to detect the high-energetic portions of the radiation which have passed through the whole atmosphere. Further, radiation outbursts on the sun are anisotropic, wherein the radiation data detected with the aid of the measurement stations advantageously allow for conclusions on the energy spectrum of the primary incident radiation and on the spatial position of the region with increased radiation intensity.

By the provision of measurement stations in commercial aircraft, it is advantageously possible to capture radiation data at cruise altitude whereby, for instance, the data detected by the measurement stations arranged at different geographic positions on the ground can be supplemented or verified.

In this manner, detection of radiation data serving for the creation of the model in method step c) is possible in a particularly advantageous manner.

Preferably, it is provided that, in step a), there are additionally detected radiation data from the near-atmospheric region, this detection being performed by satellite-based measurement instruments. By means of the satellite-based measurement instruments, also radiation data of low-energetic radiation portions which would not penetrate the atmosphere can be detected, thus allowing for a very precise conclusion on the energy spectrum of the particles of the event of relevance for the radiation dose.

According to one embodiment of the invention, it is provided that, in step a), radiation data in the form of data sets are detected at a temporal interval t, said data sets including radiation data of a predefined period of time. Particularly, it can be provided that the data sets contain the radiation data which occurred since the detection of the preceding data set, in other words: The predetermined period of time corresponds to the temporal interval between the detection of two consecutive data sets. Since radiation data are often detected in the form of count rates, the method of the invention thus makes it possible that the data sets include informative radiation data and that the quantity of data which is to be processed is kept low. A temporal interval of about 5 minutes has proven to be particularly advantageous because, in such a time period, there can be detected sufficient data about the radiation to allow for conclusions on the energy spectrum.

In this regard, it can be provided in particular that, in step b), the radiation data are examined with respect to a threshold value and, when the threshold value is exceeded in a predetermined number of consecutive data sets, a conclusion is drawn on an event of relevance for the radiation dose.

It has become evident that e.g. in case of three consecutive data sets whose radiation data exceed a threshold value, there can be concluded with high reliability to an event of relevance for the radiation dose such as e.g. a radiation outburst on the sun. On the basis of this data set and subsequent data sets, the model can then be created in method step c).

In this regard, it can be provided in particular that, in step c), the model is created after acquisition of a predetermined number of data sets. The number of consecutive data sets used for a conclusion to an event of relevance for the radiation dose will mostly not yet be sufficient for a reliable creation of the model in method step c). In the process, subsequent data sets will be detected and the model will be created only then. In other words: The number of data sets for creating the model is larger than the number of consecutive data sets which would make it possible to conclude that an event of relevance for the radiation dose exists. It has become evident that already after half an hour or six data sets, which each have been detected at an interval of 5 minutes, a model can be created in a reliable manner.

According to a preferred embodiment of the invention, it is provided that, after creation of the model in method step c), method step a) will be repeated and the model will be adapted on the basis of the additionally included radiation data. Preferably, the model will be adapted on the basis of the additionally included radiation data in a continuous manner. In other words: The model, after being created, can be verified or adapted and respectively improved by the additionally included radiation data. Thus, the model will be increasingly more precise and improved. In this regard, it can be provided that, in method step e), a calculation of further flight paths is performed on the basis of the adapted model. Thus, the flight paths to be calculated at a later time can be obtained on the basis of the substantially more precise model. Of course, it can also be provided that the already calculated and respectively adapted flight paths will be newly adapted on the basis of the increasingly precise model.

Thus, the method of the invention makes it possible to obtain, from said model and on the basis of the measurement data and the aircraft parameters, a dose estimate for the remaining flight path and, in quasi-real-time, to make available options for acting under consideration of predefined secondary conditions such as flight-relevant parameters, and to achieve a reduction of the exposure to radiation.

The method of the invention can provide that said model is a dynamic model which includes quantitative information about the radiation intensity and its variation over time. It has become evident that, e.g. in case of a radiation outburst on the sun, the highest radiation intensity will be generated already at the beginning of the event and that the change occurring over time will consist in a decrease of the radiation intensity.

By use of said model, it can thus be advantageously detected how the future development of the radiation intensity will proceed in the region with increased radiation intensity caused by the event of relevance for the radiation dose. In this manner, the flight paths can be adapted with regard to a reduction of radiation exposure in an especially advantageous manner. By the prediction under the temporal aspect, it is possible e.g. to consider a flight path through a region which at the current point of time still has an undesirably high radiation intensity but, at the time when the aircraft is to traverse the region, will already have an acceptable radiation intensity.

According to one embodiment of the invention, the inventive method provides that, in step c) in the creating of the model, there is drawn a conclusion from the radiation data to an energy spectrum of the particles of the event of relevance for the radiation dose.

The spatial and temporal estimation of the radiation intensity caused by events of relevance for the radiation dose can be performed e.g. on the basis of the findings described in the dissertation "The radiation environment in the lower atmosphere—A numerical approach", Christian-Albrechts-Universität zu Kiel, 2009, by Daniel Matthia.

With reference to the sole FIGURE, the invention will be explained in greater detail hereunder.

In the sole FIGURE, the function of the method of the invention is schematically illustrated.

The method of the invention serves for flight computation of aircraft 100 under consideration of events of relevance for the radiation dose. In this regard, it is particularly desired that an additional dose-relevant radiation component on the cruise altitude 110 of said aircraft 100 will be detected and respectively predicted.

The method according to the invention provides that, first, radiation data of the atmospheric radiation 10 will be determined. For this purpose, use can be made of measurement stations 12 arranged e.g. at different geographic positions on the ground. These measurement stations 12, which can be designed e.g. as neutron monitors, will determine e.g. high-energetic radiation portions which penetrate the whole atmosphere. Additionally, for capturing the radiation data of the atmospheric radiation 10, measurement stations 14 can be arranged on the aircraft 100 and thus will determine the radiation directly at cruise altitude 110. The captured radiation data will be transmitted to a central station 16 and be evaluated e.g. by means of a computer. In the FIGURE, the data transmission is represented by the arrows. The radiation data are determined in the form of data sets at a temporal interval t, wherein the data sets contain radiation data covering the time period from the most recent data set determination.

The radiation data are examined with regard to a threshold value, wherein, when the threshold value of at least three consecutive data sets is exceeded, a conclusion is drawn on an event of relevance for the radiation dose such as e.g. a radiation outburst on the sun.

Subsequently, further data sets of radiation data are determined, wherein, after acquisition of e.g. six data sets from the radiation data, a model is created which comprises an estimate of the spatial position of a region with increased radiation intensity caused by the event of relevance for the radiation dose. The model can further include quantitative information concerning the radiation intensity and can predict a temporal change of the radiation intensity in the region with increased radiation intensity.

Further, flight-relevant parameters are transmitted from the aircraft 100 to the central station 16. On the basis of the model and the flight-relevant parameters, which can include e.g. the fuel quantity and respectively fuel reserve, the maximum tolerated radiation exposure, the duration of the flight and e.g. meteorological data, a new flight path is detected which in comparison to the previously chosen flight path will involve a reduced exposure to radiation. In the process, particular care is taken that, by use of the flight-relevant parameters, particularly the remaining fuel quantity, the newly chosen flight path can be practiced at all. The newly generated flight path will then be transmitted from the central station 16 to the aircraft 100 and be indicated to the aviator as an option for acting.

In creating the model, the acquired radiation data are used to conclude on the energy spectrum of the particles of the event of relevance for the radiation dose.

Apart from the radiation data of the atmospheric radiation 10 which are detected by the measurement stations 12 and the measurement stations 14 installed in the aircraft 100, it is possible to additionally detect radiation data of radiation 20 in the near-atmospheric range, wherein this is performed by satellite-based measurement instruments 22. Also these additional radiation data are transmitted to the central station 16 and are considered when creating the model. Thereby, the model can be created essentially more precisely because, in the near-atmospheric region, also low-energetic radiation can be determined which is not measurable by the ground-based measurement stations 12. The radiation data from the near-atmospheric region allow for a more precise conclusion on the energy spectrum of the event of relevance for the radiation dose so that an essentially more precise model can be created.

The method of the invention can further provide that the created model is continuously improved and respectively adapted by the inclusion of further radiation data. Also the computed flight path can be continuously adapted to the model so that flight paths can be transmitted to the aircraft 100 in quasi-realtime.

The model can thus be a dynamic model which describes the development of a region with increased radiation intensity caused by the event of relevance for the radiation dose.

Of course, it is also possible to use the method of the invention to calculate flight paths of aircraft which are not yet in the air. Thus, there can be created alternative flight path proposals to already created or still-to-be-created flight paths, in which the event of relevance for the radiation dose is considered. The newly calculated flight paths can be obtained on the basis of the planned flight-relevant parameters. Of course, it is also possible to adapt the flight-relevant parameters, such as e.g. the fuel quantity, for achieving a flight path with reduced exposure to radiation. The flight-relevant parameters are of course also economical parameters so that a tradeoff can be performed between the reduction of the exposure to radiation and economical aspects.

The invention claimed is:

1. A method for the calculation of flight paths taking into consideration events of relevance for the radiation dose, comprising the following steps: a) collection of radiation data of the atmospheric radiation from measurement stations located on the ground, installed in aircrafts and/or installed in satellites, b) examination of the radiation data and conclusion about an event of relevance for the radiation dose that generates a temporary increase in exposure, c) creation of a model using the radiation data, the model containing at least one estimate of the spatial location of a region with a radiation intensity increased by the event of relevance for the radiation dose, d) determination of flight-relevant parameters, e) calculation of a possible flight path in view of the flight-relevant parameters taking into consideration the model created in step c), the flight path being determined on the basis of a reduction of an exposure to radiation in relation to another flight path prior to flight or in relation to an existing flight path if the aircraft already is in flight, and f) providing the possible flight path for selection.

2. The method according to claim 1, wherein, in step d), the flight-relevant parameters are determined before a flight, for calculation of a flight path as an alternative to a conventional flight path in step e).

3. The method according to claim 1, wherein, in step d), the flight-relevant parameters of an aircraft in flight are determined for calculation of a bypass route as an alternative flight path in step e).

4. The method according to claim 1, wherein the radiation data are determined by measurement stations, preferably neutron monitors, arranged at different geographic positions, and/or by measurement stations installed in commercial aircraft.

5. The method according to claim 1, wherein, in step a), there are additionally determined radiation data from the near-atmospheric region, this detection being performed by satellite-based measurement instruments.

6. The method according to claim 1, wherein, in step a), radiation data in the form of data sets are determined at a temporal interval, said data sets including radiation data of a predefined period of time.

7. The method according to claim 6, wherein, in step b), the radiation data are examined with respect to a threshold value and, when the threshold value is exceeded in a predetermined number of consecutive data sets, a conclusion is drawn on an event of relevance for the radiation dose.

8. The method according to claim 6, wherein, in step c), the model is created after acquisition of a predetermined number of data sets.

9. The method according to claim 1, wherein, after creation of the model in method step c), said method step a) is repeated and the model is continuously adapted on the basis of the additionally included radiation data.

10. The method according to claim 9, wherein, in method step e), a calculation of further flight paths is performed on the basis of the adapted model.

11. The method according to claim 1, wherein said model is a dynamic model which includes quantitative information about the radiation intensity and its variation over time.

12. The method according to claim 1, wherein, in step c) in the creating of the model, there is drawn a conclusion from the radiation data to an energy spectrum of the particles of the event of relevance for the radiation dose.

\* \* \* \* \*